United States Patent [19]

Kuklinski

[11] Patent Number: 4,802,396
[45] Date of Patent: Feb. 7, 1989

[54] SABER SAW BLADE

[76] Inventor: Anthony K. Kuklinski, 426 Penn Rd., Norristown, Pa. 19401

[21] Appl. No.: 196,811

[22] Filed: May 19, 1988

Related U.S. Application Data

[63] Continuation of Ser. No. 385,346, Jun. 7, 1982, abandoned.

[51] Int. Cl.$^4$ ............................................. B27B 33/02
[52] U.S. Cl. ...................................... 83/849; 83/835; 83/850
[58] Field of Search ................. 83/848, 849, 850, 835, 83/854, 855

[56] References Cited

U.S. PATENT DOCUMENTS

| 95,052 | 9/1869 | Smith et al. | 83/850 |
| 112,569 | 3/1871 | Emerson | 83/849 |
| 3,716,916 | 2/1973 | Alexander | 83/835 |

FOREIGN PATENT DOCUMENTS 0015624  1/1982  Japan ..................................... 83/849

Primary Examiner—Donald R. Schran
Attorney, Agent, or Firm—Eugene Chovanes

[57] ABSTRACT

A saber saw blade having shearing teeth and cleaving teeth in combination wherein the shearing teeth alternatively cut the fiber on opposite sides of the kerf, and the cleaving teeth separate out the sheared fiber. The saw cuts on both portions of the reciprocating stroke.

1 Claim, 3 Drawing Sheets

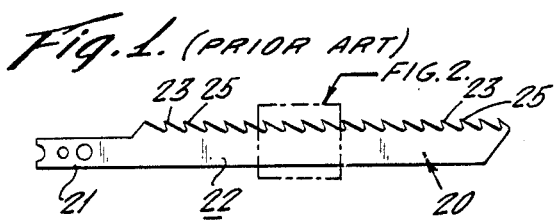
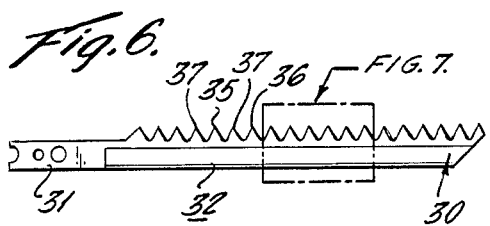
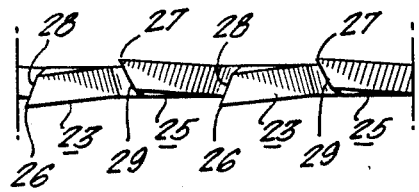
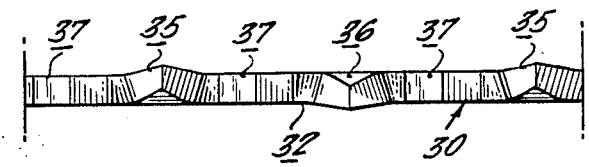
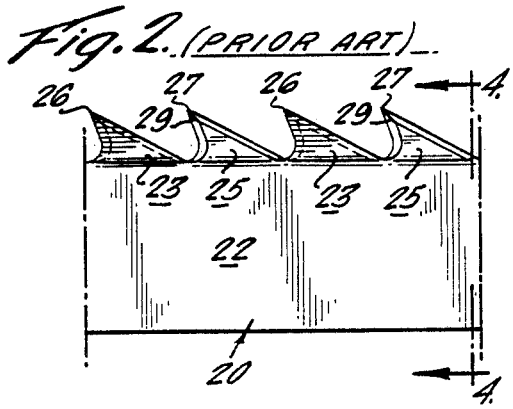
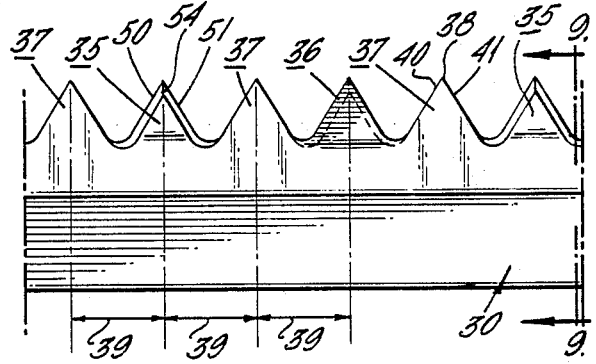
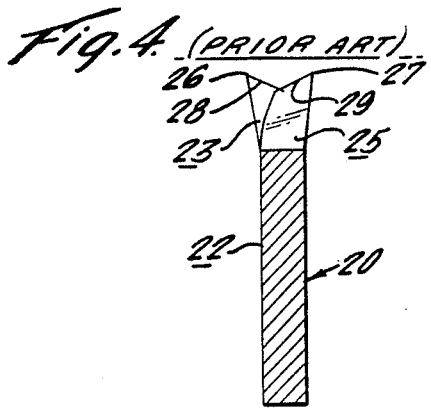
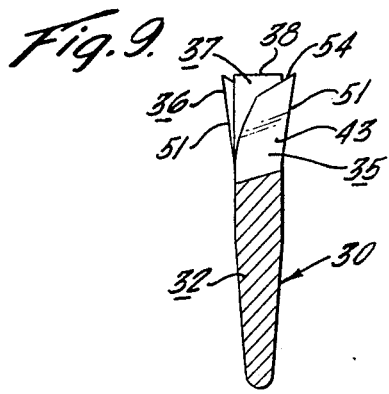
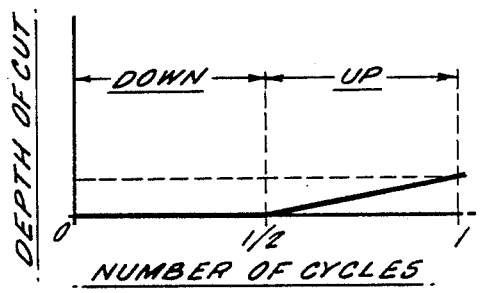
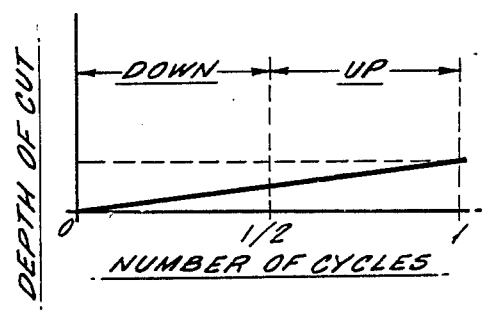

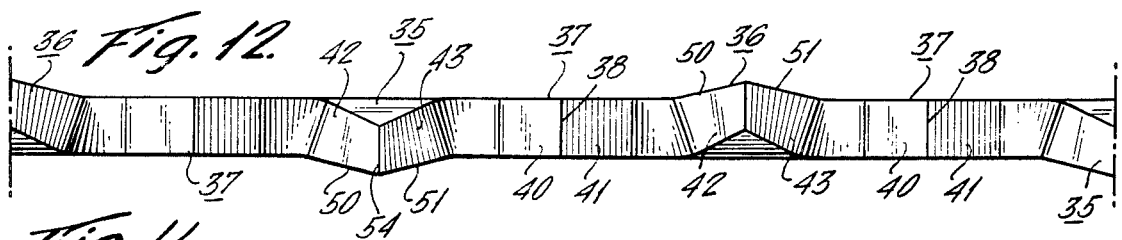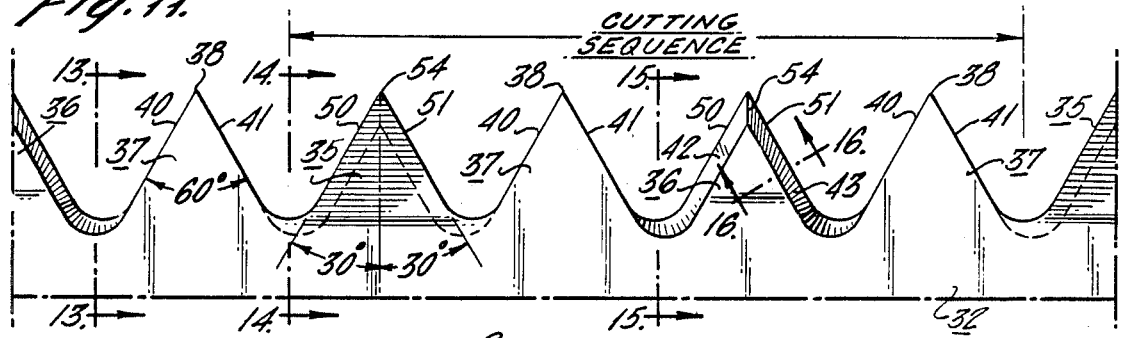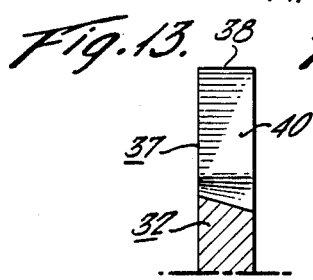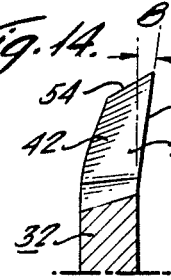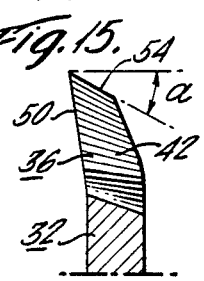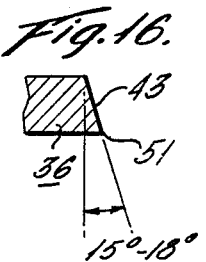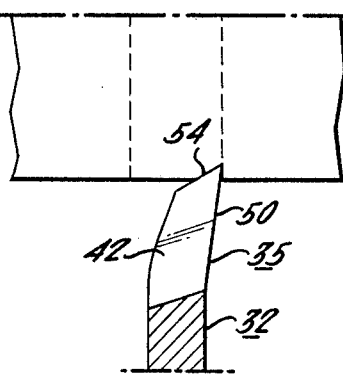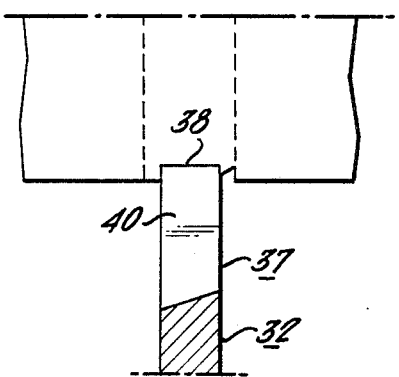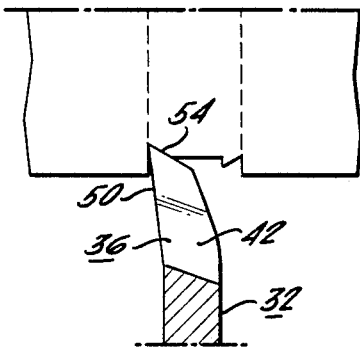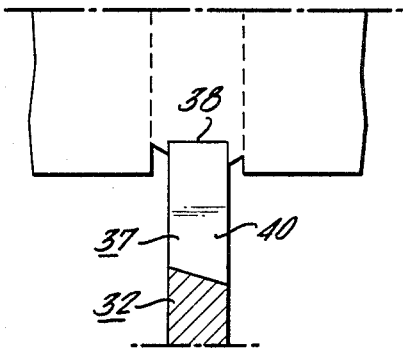

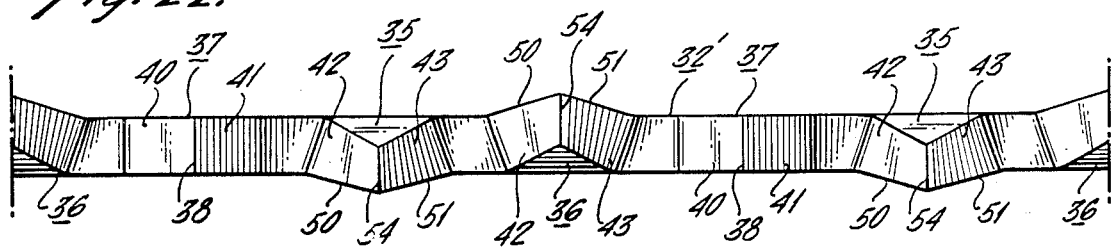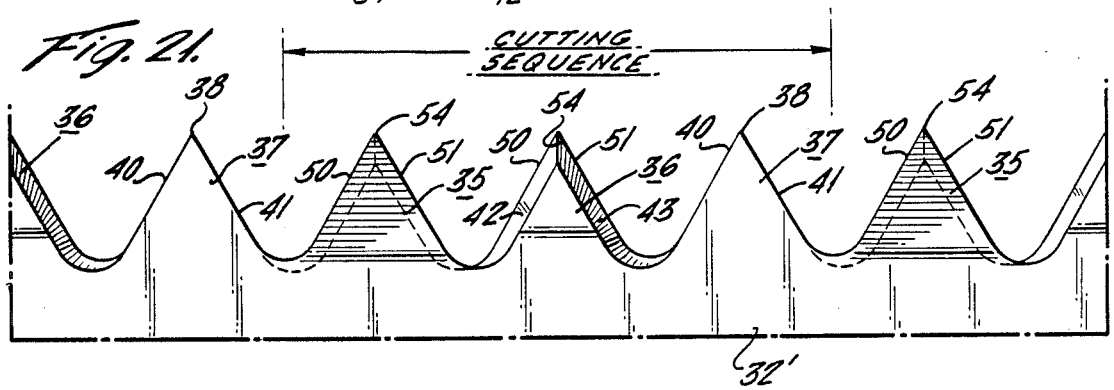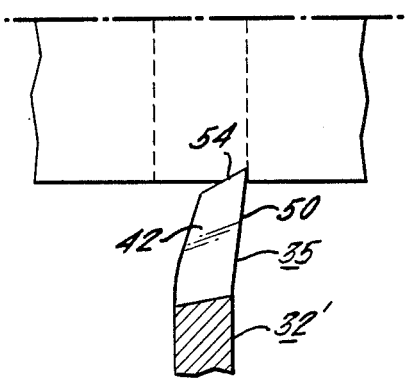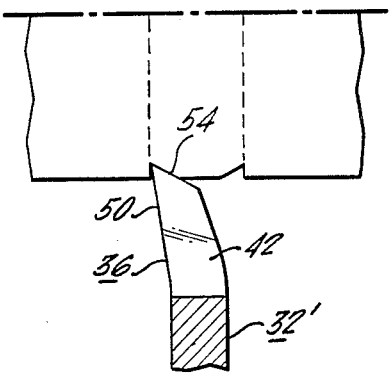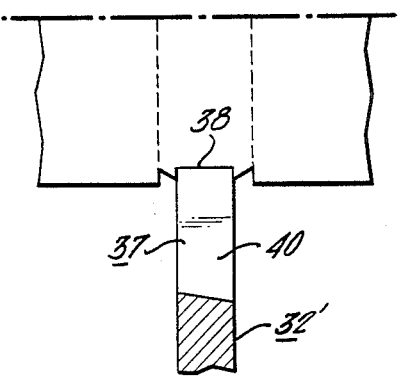

SABER SAW BLADE

This application is a continuation of application Ser. No. 385,346, filed June 7, 1982, now abandoned.

BACKGROUND OF THE INVENTION

1. Field of the Invention:

The field of invention relates to portable jigsaws, sometimes called "saber saws." These saws are used to make straight or curved cuts, particularly in wood, plywood, hard board and laminates. The saws are used, for instance, to rip, cross-cut, bevel, miter, and make interior cuts. Saber saws consist essentially of a portable, hand-held, electric motor which is gear-connected to a reciprocating element which supports the blade. The blade is a thin, flat metal strip and has teeth along a long edge. The blade reciprocates longitudinally.

The invention relates to the blade, and particularly to the teeth on the blade.

2. Description of the Prior Art:

Prior art saber saw blades are well known and extensively used. The blades vary in length from, for instance, 2½" to 4" or more. They are used extensively for cutting wood, plywood, hard wood, laminates and the like.

A portable, hand-held electric motor drives the blade in a reciprocating fashion up to, for instance, 3200 strokes per minute with a stroke length of, for instance, approximately ⅞". The saws are generally operated in a manner whereby the blade extends transversely, or perpendicularly, through the material being sawed, wherein the material extends in a horizontal plane and the blade extends in a vertical plane and reciprocates therein.

In operation, the saw blade reciprocates while the saw is being held and forced into the particular cut it is making the wood. Generally, the plane of the wood extends horizontally and the saw is held vertically while cutting the wood. The teeth conventionally extend forward of the operator when the saw is used and pushed forward by the operator. The teeth of the saw are such that the saw cuts only on the return movement of the blade as the blade reciprocates longitudinally upwardly toward the saw. As the blade reciprocates downwardly, o away from the saw motor, there is relatively little cutting action, since the teeth are designed specifically to cut on the upward or return stroke.

Several problems exist with respect to such prior art blades:

(1) A primary problem is that the prior art saber saw cutting action is grossly inefficient. The cutting action occurs only on one-half of the reciprocating strokes; namely, the upward stroke, and virtually all cutting is lost on the downward stroke. Much time and energy is lost in such cutting action, since the downward stroke is wasted.

(2) A further problem is that the blade gets dull not from cutting the wood, but from the non-cutting, inefficient, downward stroke. The blade heats up from friction on the downward stroke, when the teeth are dragged under pressure across the wood. The blade is continuously being pushed against the wood in the cutting direction by the operator who does not distinguish in applying pressure between the upward and downward movements of the reciprocating blade. Movement is so rapid that selective pressure is impossible. The friction creates heat in the teeth, eventually causing the blade to lose its temper, and to develop dull rounded points. These dull points in turn produce more friction and heat, causing the teeth to become even more dull.

(3) Another problem is that blades are used up relatively rapidly. Since the blades are generally originally tempered and relatively hard, it is extremely difficult for the average work man to sharpen the blade by refiling. The blade is generally thrown away.

(4) Another problem is the relatively ragged finished cut that results from the blade action. The teeth on the prior art saber blade have a hook form, with the hooks pointed in an upward direction. These hook teeth exert a chiseling action on the upward stroke, ripping the fibers of the wood. Adequate force is available from the saw motor to overcome fiber resistance, and when necessary, the fibers are even torn and the wood splintered to accomplish the cutting effect. Such ragged cut is particularly prevalent when a crosscut is being made.

(5) A further problem is that the saw itself, and particularly the motor is being intermittantly loaded on the upward stroke and unloaded on the downward stroke, resulting in uneven and harmful loading on the saw motor. Additionally, unwanted vibration occurs.

(6) Since virtually all cutting takes place on an upward stroke, most of the sawdust from the cutting process is moved upwardly and deposited on the working surface of the board. This obscures the guidelines to a point where the operation of sawing must be periodically stopped and sawdust blown away either mechanically or manually.

In summary, we have a blade in the prior art which is inefficient since it only cuts on one-half of its reciprocation, which creates friction on the downward stroke where there is very little cutting, causing the blade to dull and be discarded, which has a relatively rough tearing action in its cut, and which deposits most of the sawdust on the line of the cut.

SUMMARY OF THE PRESENT INVENTION

With the saber saw blade of the present invention, cutting action occurs on both the upward and downward movement in the reciprocating stroke. The cutting action is equally effective on both portions of the reciprocating stroke, whereby efficiency is increased, friction is minimized, cutting action is greatly enhanced, the volume of cut is significantly increased for a given time, a smoother cut results, blade life is extended, and there is less wear and tear on the saw itself since the cutting action is smoother and also more constant. There is less vibration in the machine. The operator pressure required is substantially less since the cut is smoother and the operator can better control the cut.

The benefits of the present invention result from the particular teeth design on the saw blade.

The present blade has a combination of teeth which include shearing teeth of a certain design, and cleaving teeth of a certain design. The shearing teeth have a set with respect to the body of the blade, whereas the cleaving teeth lie in the plane of the blade and have no set. The shearing teeth and cleaving teeth work in combination and sequentially, wherein the shearing teeth shear cut the wood fibers alternatively at the side of the kerf and cleaving teeth split, separate, and remove the sheared fiber.

The teeth of the blade are equally effective in the direction of the grain as well as across the grain, as well as at any angle with respect to the grain. The teeth work particularly well in plywood or laminates wherein the wood is laminated to provide alternative layers of opposing grains so that the blade is simultaneously cutting with and against the grain, with equal effectiveness.

The saw itself is easily held in contact with the wood while the blade is cutting on the downward stroke whereby there is reaction against the saw which has a tendency to push the saw upward. On the upward stroke, of course, there is no downward pressure necessary by the operator, since the weight of the machine as well as the shoes on the machine support the saw on the surface of the wood against the downward pull of the blade on the upward cutting movement.

Additionally, in the present invention, the cutting sequence is spread over more teeth than in the prior art cutting sequence. A cutting sequence is defined as a number of teeth necessary in combination to create a cut. Hence, there is less tendency for the saw to lift or jump.

Whereas in the prior art, one was hooking and tearing on the upward stroke, in the present invention one is shearing and cleaving sequentially to provide a great frequency of operations per movement of the blade. Specifically, in the present invention, a specific shearing action occurs on one side of the kerf from one shearing tooth after which an adjacent cleaving tooth cleaves the wood fibers in the kerf adjacent to the shearing cut in the kerf, after which the fiber is sheared on the opposite side of the first shear.by an adjacent shearing tooth. The same sequence occurs on the reciprocating movement, so one has repetitively on the upward and downward strokes a combination of shearing and cleaving actions.

Cleaving action is best defined as separating by splitting. Considering that wood is comprised of hollow parallel grouped tubular fibers, the cleaving tooth splits these fibers from one another, or from themselves, both when the saber saw is sawing with the grain of the wood, or across the grain. A shearing tooth shear cuts the fibers on one side of the kerf before the cleaving action, and a shearing tooth cuts the fibers on the opposite side of the kerf after the cleavage action. The cleavage action takes place entirely across the width of the cleaving tooth which is of the same width as the body of the saw itself. The cleaving teeth h no set, whereas the shearing teeth do have alternative, opposing sets.

The shearing teeth and cleaving teeth are symmetrical with respect to the reciprocating strokes; that is, the same teeth design applies on both the upward and downward stroke, and the same sawing action occurs in both strokes.

The shearing action consists of a directed cutting stroke against the fibers at a fixed angle. The shearing action at the fixed angle provides a most efficient severance of the fiber at the side of the kerf, since the movement is such that rather than a vertical cut at the side o the kerf resulting from the vertical movement of the tooth, the tooth is such that it imparts an angle or shearing cut to the side. This is analogous to for instance a knife cut on a loaf of bread wherein you have movement of the blade at an angle rather than in a completely downward stroke. In this respect, this shearing action is different from the tearing action of a point on the well known prior art crosscut tooth. Basically, the prior art saber saw tooth is a crosscut configuration, exceptof course cutting occurs on the pull stroke rather than on the downward stroke.

The cleavage action is in the form of a modified chiseling action which by virtue of the shape of the cleaving tooth, provides such modified chiseling effect on both the upward and downward portions of the stroke. Similarly, of course, the shearing teeth are of a form which provides equal shearing action on the upward and downward movement.

The shearing teeth and cleaving teeth are of equal heighth.

BRIEF DESCRIPTION OF THE DRAWINGS

FIGS. 1 through 5 refer to the prior art.

FIG. 1 is a side elevation view of a typical saber saw blade of he prior art.

FIG. 2 is an enlarged fragmentary side elevational view of the portion of the jigsaw blade of the FIG. 1 bordered by the dot-and-dash box and labeled "FIG. 2".

FIG. 3 is a plan view of FIG. 2 showing further details of the tooth design.

FIG. 4 is an enlarged transverse sectional view taken on the line 4—4 of FIG. 2.

FIG. 5 is an empirical graph illustrating the cutting action of a conventional saber saw blade during one cycle.

FIGS. 6 through 10 are views of the present invention corresponding to FIGS. 1 through 5 of the prior art described above.

FIG. 6 is a side elevational view of the saber saw blade of the invention.

FIG. 7 is an enlarged fragmentary side elevational view of the portion of FIG. 6 enclosed by the dot-and-dash box and labeled "FIG. 7", showing in detail the tooth design and sequence.

FIG. 8 is an enlarged fragmentary plan view of FIG. 7 showing additional details of tooth design.

FIG. 9 is an enlarged transverse sectional view taken on the line 9—9 of FIG. 7 showing further details of tooth design and the tapering of the blade body.

FIG. 10 is an empirical graph of the cutting action of my invention for a saber saw blade.

FIG. 11 is a greatly enlarged fragmentary side elevational view of the saber saw teeth included in a 1-stroke span showing the design and sequence of the tooth design incorporated in the invention.

FIG. 12 is a plan view of FIG. 11.

FIGS. 13 to 16 are sectional views taken on the lines 13—13, 14—14, 15—15, and 16—16, of FIG. 11.

FIGS. 17 to 20 are schematic sequential views showing the cutting action of each tooth in sequence and relative depth of cut during a four-tooth sawing cycle.

FIG. 21 is a side elevational view similar to FIG. 11 but illustrating an embodiment having a three-tooth cutting sequence.

FIG. 22 is a plan view of the saw of FIG. 21 corresponding to FIG. 12 showing another view of the alternative three-tooth embodiment.

FIGS. 23 to 25 inclusivie show steps in the cutting sequence of the three-tooth embodiment corresponding to FIGS. 17 to 20 of the first embodiment shown and described.

DESCRIPTION OF THE PREFERRED EMBODIMENT

Prior Art

Referring to FIGS. 1 to 4, there is shown a prior art saber saw blade 20 with a blade body 22. Blade body 22 has extending at one end a saw insert portion 21 having therein suitable cavities which is inserted into the blade holder of the saber saw where it is secured with a set screw as well known. The blade length varies normally from, for instance, 2½" to 4" or longer, and has thereon wood cutting teeth in the amount of, for instance, from 6 to 10 teeth per inch. The teeth 23 and 25 are set with respect to blade body 22 alternatively along the length of the saw. The cutting cycle consists of two teeth 23 and 25 which are essentially crosscut teeth which are filed for combination cutting either in the direction of the grain or across the grain of the wood fibers. The crosscut teeth are angled, as best seen in FIG. 2, in what is in effect a hook type of configuration, so that, as seen in FIG. 2, cutting takes place on the upward stroke by means of the hooked teeth which in effect tear out the fibers on a crosscut or a rip cut. Picturing the fibers as a bundle of parallel strands of hollow rope, the prior art saber saw blade actually grasps a fiber or fibers and pulls or breaks them away from the bundle to create the kerf. The teeth 23 and 25 have points 26 and 27 respectively, which are the tearing portions of the tooth.

The tearing action itself occurs at the top of the teeth on edges 28 and 29. The tearing action occurs at this edge as the blade moves upward toward the saw. It will be observed often at the bottom of the kerf that the surface is in the form of an apex which conforms to the apex or shape as seen in FIG. 4 created by the projection of the edges 28 and 29.

There is shown in FIG. 5 the depth of a cut made during a cycle. As seen on the horizontal axis, during the downstroke portion of the cycle, there is no cutting action, with only a cutting occurring on the upstroke second-half of the reciprocating cycle.

Referring to the drawings, there is shown in FIGS. 6 through 9 inclusive, views of the saw of the saw blade of the present invention corresponding to FIGS. 1 to 4 of the prior art.

A saber saw blade 30 with body 32 has the prior art insert 31 with holes as used in the prior art. The body 32 of the blade of the invention can be of the same size and dimension as the prior art. The primary invention lies in the teeth configuration as will be described.

With reference to the teeth of FIGS. 6 through 9, shearing teeth 35 and 36 have between them cleaving teeth 37. Shearing teeth 35 and 36 are identical except they are set in opposition to one another. Shearing teeth 35 and 36 are set with respect to the blade body 32 in the conventional prior art relationship in terms of the number of teeth per inch. In the teeth of the blade of the invention, a suitable setting would be a number 5 set on a standard saw set mechanism. A 5 setting on a standard hand set device, for hand saws, is well known, and is that setting normally used for a crosscut hand saw having 5 points, or teeth, per inch, which yields an angle B as seen in FIG. 14 of approximately 5° to 7½°. The function of set, as is well known, is that the saw will cut a path or kerf in the wood slightly wider than the thickness of the saw blade, to provide clearance. Normally this should give the blade of the saw a clearance of about 1/100 of an inch.

A suitable tooth density may be 6 teeth to the inch, or 6 points to the inch, although this may vary—for instance, from 4 teeth oer inch to 10 teeth per inch, more or less. The choice is dependent on the wood material being cut and is a matter of choice to the operator. Generally speaking, the harder the material and/or the smoother cut desired, the more teeth per inch. A coarser cut results from the lesser number of teeth, but the cutting action is faster. In determining the teeth per inch, both the cleaving teeth as well as the shearing teeth are included.

As seen for instance in FIG. 7, the distance 39 between the center lines of the cleaving teeth 37 and the shearing teeth 35 and 36 is equal. The topmost portions of each of the teeth 35, 36 and 37 are equal in height so that the teeth at the top are level with respect to one another. The cleaving teeth 37 as seen in FIGS. 7 and 11 form a symmetrical angle of 60° with respect to the apex edge 38. The cleaving teeth 37 are left erect, with no set, so they remain in the plane of the saw body 32. The cleaving teeth 37 are filed perpendicular to the plane of the body of the blade, at an angle of 90°. There results a symmetrical tooth having opposing sloping sides 40 and 41 disposed in a plane perpendicular to the plane of the blade body.

Reference is made particularly to FIGS. 12 through 15 to describe the shape of shearing teeth. The shape of the shearing teeth 35 and 36 will be described by reference to the filing of the teeth, by hand, with a small trianguar file. Of course, it should be understood that any other manufacturing method for achieving the shape shown and described can be used.

In filing the shear tooth, the shear tooth 35 or 36 first taks initially the form of the cleaving tooth 37 described above. In other words, a blade can be formed by first repetitively forming identical cleaving teeth 37. Selected teeth are then set to begin forming shearing teeth 35 and 36. A first initially formed tooth is set to one side of the blade body 32, and then the next tooth is left remaining as a cleaving tooth 37, and then the next initially formed tooth is set opposite the first set tooth to begin forming the second shearing tooth in the cycle. The next initially formed tooth is left to remain as a cleaving tooth 37 to complete the four-tooth cycle.

A small triangular file is then drawn across surface 42 of tooth 35 to form the surface. The file is drawn across the surface at an inclined angle of approximately 15° to 18°, as shown in FIG. 16 of the drawings.

The file is also positioned to form an included horizontal angle of approximately 60° with the blade body when the blade body is being so held vertically. The net result is that the file moves at an oblique angle on the vertically positioned saw body 32 up and to the left with reference to the blade 30, as seen in FIG. 11. Similarly, surface 43 of tooth 35 is formed with the file being inclined at an angle of 15° to the horizontal and at included horizontal angle of approximately 60° with respect to the vertially disposed blade body 32 when positioned as shown in FIG. 11.

It should be clearly understood that although the construction of a saw blade of the present invention is described in terms of manually filing so that the angle relationships can be more clearly understood, any prior art process, such as stamping, die-cutting, grinding or the like can be used to form the blade. In fact, it is intended that the blade of the invention be generally mass produced by such methods.

Shear edges 50 and 51 are formed on the shearing tooth 5, on the edges of the surfaces 42 and 43.

Surfaces 42 and 43 intersect to form an edge 54 on tooth 35.

With respect to shearing tooth 36, the same procedure is followed as tooth 35, but from the opposite side of the saw blade.

The shearing teeth 35 and 36 then take the form as shown in the drawings in FIGS. 12 through 15.

As seen in FIG. 15, the resulting edge 54 forms an angle of A of approximately 20° to 30° with the horizontal.

Shear edges 50 and 51 form an angle of approximately 30° with the vertical or, put another way, the edges 50 and 51 form an included angle of approximately 60° symmetrically about a vertical, as seen in FIG. 11.

It should be understood that the purpose of filing or shaping the shearing tooth in the manner described is to obtain the shear edges 50, and 51, since these are the edges that cut the wood fibers while the edge travels forward at an incline, much as a knife edge travels through a loaf of bread at an angle when a knife is used to cut the bread in a sawing action.

While reference is made to an edge, it is the line formed by the meeting of two planes. The word is used in the sense that it is describing the line formed by the meeting of two planes, and not in the sense of for instance a plane such as the edge plane of a door.

The cutting edges 50 and 51 respectively are lines formed by the meeting of the adjacent planes.

In actual operation, it will be seen that only the immediate edge adjacent to the apex of the tooth is involved in the actual shearing operation and in some instance would be for instance 1/16" and would range to a deeper shear in soft woods and a more shallow shear in hard woods.

In operation, the teeth act in sequence. In the above embodiment, two shearng teeth 35 and 36 oppositely set, and two cleaving teeth 37 act in combination, sequentially, to perform a kerf cut. For purposes of illustration only, the operation can be pictured as the shearing tooth first traveling for the length of the stroke to cut, by inclined shear means, a line into the wood along one side of the kerf much as an inclined sharp pocket knife run along a piece of wood would form a line cut, into the fiber. The wood is being cut by an inclined sharp surface; namely, shear edge 50 near the apex of the tooth whereby the fibers of the wood either longitudinally or transversely or obliquely, are either severed or separated. This is seen in FIG. 17. By virtue of this cutting through a shearing action, very little if any fiber is removed. As shearing tooth 35 moves through for this cutting effect with shearing action, there is virtually no resistance to movement through the wood since the tooth action is a sharp, shearing effect to cut or separate the fibers, as opposed for instance to the prior art teeth described above which is actually tearing and removing fiber simultaneously and thus creating substantial resistance to the blade movement.

To further describe the saw blade action and teeth action in a given sequence, the reference is made to the subsequent movement of a cleaving tooth through the kerf as shown in FIG. 18. The cleaving tooth 37 in its movement in FIG. 18 results in a removal of the fibers from iss position with repect to the center of the kerf, in the center of the kerf, particularly separating and rendering free the fibers from the wood at substantially all points except at the edge of the kerf opposite the cut of FIG. 17.

The cleaving tooth action is in the form of a modified chisel effect since the surface 41 or 42 of cleaving tooth 37 is at an angle other than perpendicular with respect to its movement through the kerf, as opposed to, for instance, the prior art rip tooth, which is a full chiseling effect, since its tooth face is at a right angle to the movement of the saw blade.

This modified chisel effect provides a gentle separation of the fibers by means of a cleaving effect which damages the fibers and separates them but does not tear in its action. Again, such modified chiseling, or cleaving action, results in less resistance to blade movement.

As seen in FIG. 19, a shearing tooth 36 then moves through the kerf at the side opposite the cut of FIG. 17 wherein the separated fibers caused by the teeth action of FIGS. 17 and 18 are cut by shearing action and dropped out of the kerf. Simultaneously the tooth also begins a new cut which is the equivalent of the cut referred to in FIG. 17. The effect is that the prior disturbed fibers are cut and removed and new fibers which have hitherto been intact, are now cut.

In the described action, there is substantially less jarring and traumatic effect on the saw since the energy necessary in cutting the kerf is more equally distributed over what in any circumstances is a jarring action of the reciprocating saw since it starts and stops in such a short movement. The load imparted to the saw is a relatively evenout one and a gentler one during saw movement.

In FIG. 20, the cleaving tooth 37 moves forward with the same action and performs essentially the same function as in FIG. 18.

Although the actions have been described individually above, it is understood that the teeth being placed one adjacent another perform the several functions virtually simultaneously but, nevertheless, sequentially. The total effect is a clean, gentle, efficient action which results in a kerf which is relatively smooth since no tearing takes place.

The present saw blade relies much more on efficiency and delicateness of fiber removal than does the rash tearing of the prior art.

It will be seen in FIG. 9 particularly that the blade body 32 can take a tapered cross-sectional design or form, along the length of the blade as illustrated in FIG. 6. Such tapered blade body permits a smaller turning radius in a circular cut. The taper avoids as much interference with the side of the kerf than occurs in a parallel side blade, so that sharper turns can be made.

In view of my invention and disclosure, variations and modifications to meet individual whim or particular need will doubtless become evident to others skilled in the art, to obtain all or part of the benefits of my invention without copying the structure shown, and I therefore claim all such insofar as they fall within the reasonable spirit and scope of my claims.

Having thus described my invention, what I claim as new and desire to secure by Letters Patent is:

1. For cutting a kerf in wood composed of fibers, a saber saw metal blade in the form of a longitudinally extending web having teeth extending generally in the plane of the web along one side thereof, with means on the web to secure the blade at one end to a reciprocating motor-driven saw so that the blade reciprocates longitudinally of the saw; the improvement comprising a tooth combination of
   (1) shear teeth for shearing fibers at the side of the kerf, and
   (2) cleaving teeth for partially cleaving fibers cut on one side of the kerf,
   wherein
   (1) a single cleaving tooth alternates with a single shear tooth;
   (2) the shear teeth have a set out of the plane of the web, with alternating shear teeth having opposite sets; and (3) the cleaving teeth lie in the plane of the web: whereby, when the saw blade reciprocates, a sawing action occurs wherein
- (1) a first shear tooth set to one side of the web first shears wood fibers at the side of the kerf of the set;
- (2) a cleaving tooth adjacent the first shear tooth partially cleaves the said first sheared fivers from the wood, the said cut fibers remaining intact at the side of the kerf opposite the cut made by the first shear tooth, and
- (3) a second shear tooth set opposite the first shear tooth shears the said partially cleaved fibers at the side of the kerf opposite the first shear;

wherein the teeth are symmetrical, whereby the shearing and cleaving action set forth occurs in each direction of reciprocation.

* * * * *